United States Patent

Matsuura

[19]

[11] Patent Number: 6,094,034

[45] Date of Patent: Jul. 25, 2000

[54] METHOD OF CHARGING A SECONDARY BATTERY AND APPARATUS FOR THE SAME

[75] Inventor: Kouji Matsuura, Asaka, Japan

[73] Assignee: Fuji Photo Film Co., Ltd., Kanagawa, Japan

[21] Appl. No.: 09/031,058

[22] Filed: Feb. 26, 1998

[30] Foreign Application Priority Data

Feb. 26, 1997 [JP] Japan ................................ 9-042659

[51] Int. Cl.⁷ ....................................................... H02J 7/00
[52] U.S. Cl. ........................... 320/134; 320/139; 320/152
[58] Field of Search ..................................... 320/134, 162, 320/163, 164, 139, 140, 141, 145

[56] References Cited

U.S. PATENT DOCUMENTS

| 5,654,622 | 8/1997 | Toya et al. | 320/129 |
| 5,747,969 | 5/1998 | Tamai | 320/145 |
| 5,808,446 | 3/1997 | Eguchi | 320/134 |
| 5,808,447 | 2/1997 | Hagino | 320/155 |

FOREIGN PATENT DOCUMENTS 4-123771  4/1992  Japan .
7-274404  10/1995 Japan .

*Primary Examiner*—Peter S. Wong
*Assistant Examiner*—Pia Tibbits

[57] ABSTRACT

A charging apparatus for charging a secondary battery of the present invention includes a DC/DC converter for outputting a preselected DC voltage and a preselected DC current limited by a voltage setting circuit and a current limiting circuit, respectively. A control circuit senses the voltage of a secondary battery connected to the apparatus and causes the current limiting circuit to set up a first current lying in a constant current range until the battery voltage reaches a full charge voltage. At this instant, the control circuit switches a charge switching circuit in order to apply the first current to the battery in the form of pulses. As soon as the battery voltage reaches the full charge voltage, the control circuit applies a current lower than the current in the constant current range and the current in the constant range to the battery alternately in the form of bilevel pulses. The apparatus is capable of reducing charging time without increasing loads on switching devices, and insures the safety of the battery.

24 Claims, 13 Drawing Sheets

METHOD OF CHARGING A SECONDARY BATTERY AND APPARATUS FOR THE SAME

BACKGROUND OF THE INVENTION

1. Field of the Invention

The present invention relates to a method of charging a secondary battery and an apparatus therefor and, more particularly, to a method of charging a lithium ion battery or similar non-aqueous secondary battery and an apparatus for the same.

2. Description of the Background Art

Today, small size, light weight and handy apparatuses implemented by advances in electronic technologies are widely used. Such handy apparatuses are powered by rechargeable secondary batteries. Handy phones and video cameras, for example, are loaded with lithium batteries or similar secondary batteries which are small size, light weight, and have a large capacity.

Japanese patent laid-open publication No. 123771/1992 (Document 1 hereinafter), for example, discloses the following method of charging a secondary battery. The method consists of continuously charging a secondary battery with a constant or semiconstant current until the battery reaches a preselected voltage, and thereafter repeatedly turning on and off a switch included in a charging path connected to the battery so as to repeat pulse charging. This method is directed toward a short charging time.

On the other hand, Japanese patent laid-open publication No. 274404/1995 (Document 2 hereinafter) teaches a charging apparatus including a circuit for determining that a protection circuit included in a battery pack has operated for protection. After the operation of the protection circuit, the apparatus sets up a charge voltage lower than a protection voltage assigned to the protection circuit or varies the charge voltage level periodically so as to repeat charging by cancelling the protective operation periodically.

The charging method taught in Document 1 leaves the following problems unsolved. The switch included in the charging path for effecting pulse charging after constant current charging is continuously turned on during constant current charging. As a result, a heavy thermal load acts upon a semiconductor device constituting the switch, resulting in a bulky charging apparatus. Moreover, the semiconductor device is periodically turned off during pulse charging in order to fully shut off the charge current. This degrades the charging efficiency for a unit time.

A problem with Document 2 is that a voltage cannot be sensed without resorting to voltage sense terminals provided on both of the battery pack and charging apparatus. This, coupled with the fact that the battery pack must switch its charge sense current and discharge sense current at the time of current sensing, makes the charging apparatus complicated in construction. Another problem is that the safety of the battery pack is degraded when, e.g., the circuit for detecting the operation of the protection circuit fails. In addition, the failure of such a circuit deteriorates the cycling efficiency of the battery.

As for an apparatus for charging a lithium ion secondary battery, constant current, constant voltage charging is effected while setting a limit on the charge current. In this case, the limit may be increased for a rapid charging purpose. However, this kind of scheme is not feasible without increasing the current rating of a switching device included in the charging apparatus, also increasing the size of the apparatus. Moreover, the charging time in the constant voltage charging range increases. In addition, the increase in charge current requires the protection circuit of the battery pack to be rearranged accordingly and brings about a temperature rise in the apparatus. This is undesirable from a safety standpoint.

SUMMARY OF THE INVENTION

It is therefore an object of the present invention to provide a charging method capable of charging a secondary battery in a short period of time without increasing loads on switches, and insuring the safety of the battery, and an apparatus for the same.

In accordance with the present invention, an apparatus for charging a secondary battery having a function of shutting off, upon detecting an overcharge voltage, a charging path thereof to thereby obviate overcharging includes a DC power feeding device feeding a preselected DC voltage and a preselected DC current for charging the secondary battery. A switching circuit repeatedly turns on and turns off the output of the DC power feeding section to thereby switch a charge current for the secondary battery in the form of pulses. A voltage control circuit controls the DC voltage fed fro m the DC power feeding section to a preselected voltage lower than the overcharge voltage of the secondary battery. A current limiting circuit limits the DC current fed from the DC power feeding section to a preselected current. The current limiting circuit is capable of selectively switching the DC current to at least a first current for a constant current range or a second current lower than the first current and corresponding to a current to appear at the end of a charging operation. A control circuit controls the switching circuit, voltage control circuit and current limiting circuit on the basis of the terminal voltage of the secondary battery, the output voltage of the DC power feeding section and a charge current to thereby control charging of the secondary battery. The control circuit causes the current limiting circuit to maintain the first current until the terminal voltage of the secondary battery reaches a full charge voltage, while causing the switching circuit to repeatedly turn on and turn off the first current in the form of pulses, and causes, upon detecting a rise of the terminal voltage to the full charge voltage, the current limiting circuit to switch the first current and second current in the form of pulses to thereby charge the secondary battery with resulting bilevel pulse currents.

Also, in accordance with the present invention, a method of charging a secondary battery having a function of shutting off, upon detecting an overcharge voltage, a charging path thereof to thereby obviate overcharging begins with the step of repeatedly turning on and off a preselected first current, which starts decreasing when the terminal voltage of the secondary battery reaches a full charge voltage, in the form of pulses until the terminal voltage reaches the full charge voltage, thereby charging the secondary battery. When a rise of the terminal voltage to the full charge voltage is detected, the first current is replaced with a second current lower than the first current and corresponding to a current to appear at the time of full charging. At this instant, the second current is again replaced with the first current when the terminal voltage falls below the full charge voltage. The first current and second current are switched alternately in the form of pulses, thereby further charging the secondary battery with bilevel pulse currents. Subsequently, when the first current sequentially decreases to reach a value corresponding to the second current, charging is stopped, determining that the charging operation has completed.

Further, in accordance with the present invention, a method of charging a secondary battery having a function of shutting off, upon detecting an overcharge voltage, a charging path thereof to thereby obviate overcharging begins with the step of repeatedly turning on and off a preselected first current, which starts decreasing when the terminal voltage of the secondary battery reaches a full charge voltage, until the terminal voltage reaches a first voltage corresponding to the full charge voltage, thereby charging the secondary battery by pulse charging. When a rise of the terminal voltage to the first voltage is detected, the first current is replaced with a second current lower than the first current and corresponding to a current to appear at the time of full charging. At this instant, the second current is again replaced with the first current when the terminal voltage falls below the full charge voltage. The first current and second current are switched alternately in the form of pulses, thereby further charging the secondary battery with bilevel pulse currents. When the terminal voltage reaches a second voltage higher than the first voltage, but lower than the full charge voltage, the first current is replaced with the second current, thereby further charging the secondary battery by pulse charging. The first current and second current are switched in the form of pulses, thereby further charging the secondary battery with bilevel pulse currents. Charging is stopped when the first current sequentially decreases to reach a value corresponding to the second current during pulse charging, determining that a charging operation has completed.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
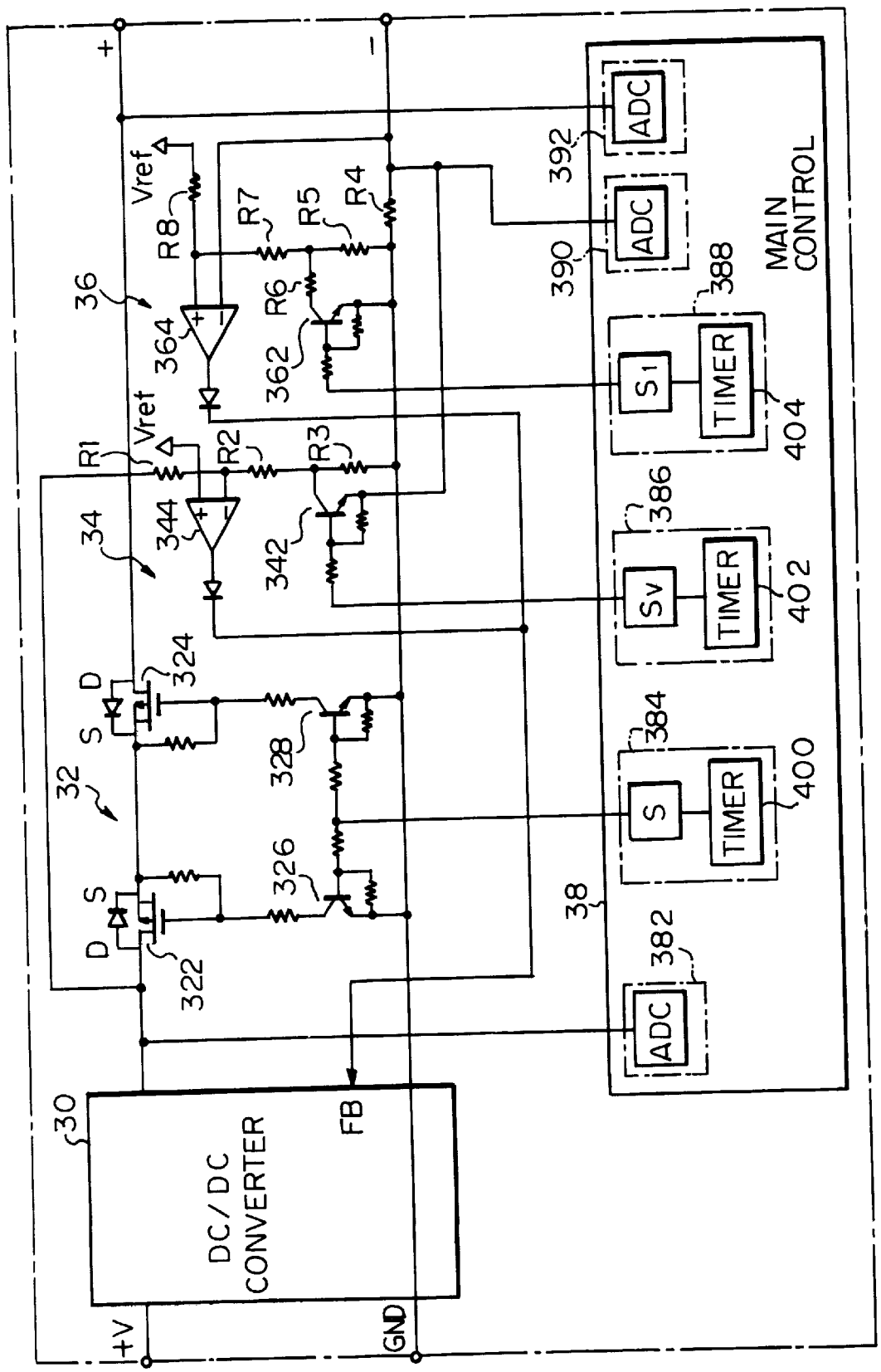
FIG. 1 is a block diagram schematically showing a charging apparatus embodying the present invention.

Referring to FIG. 1 of the drawings, a charging apparatus for charging a secondary battery and embodying the present invention is shown. To better understand the illustrative embodiment, a specific configuration of the secondary battery applicable to the present invention will be described with reference to FIG. 2.

Figure 2:
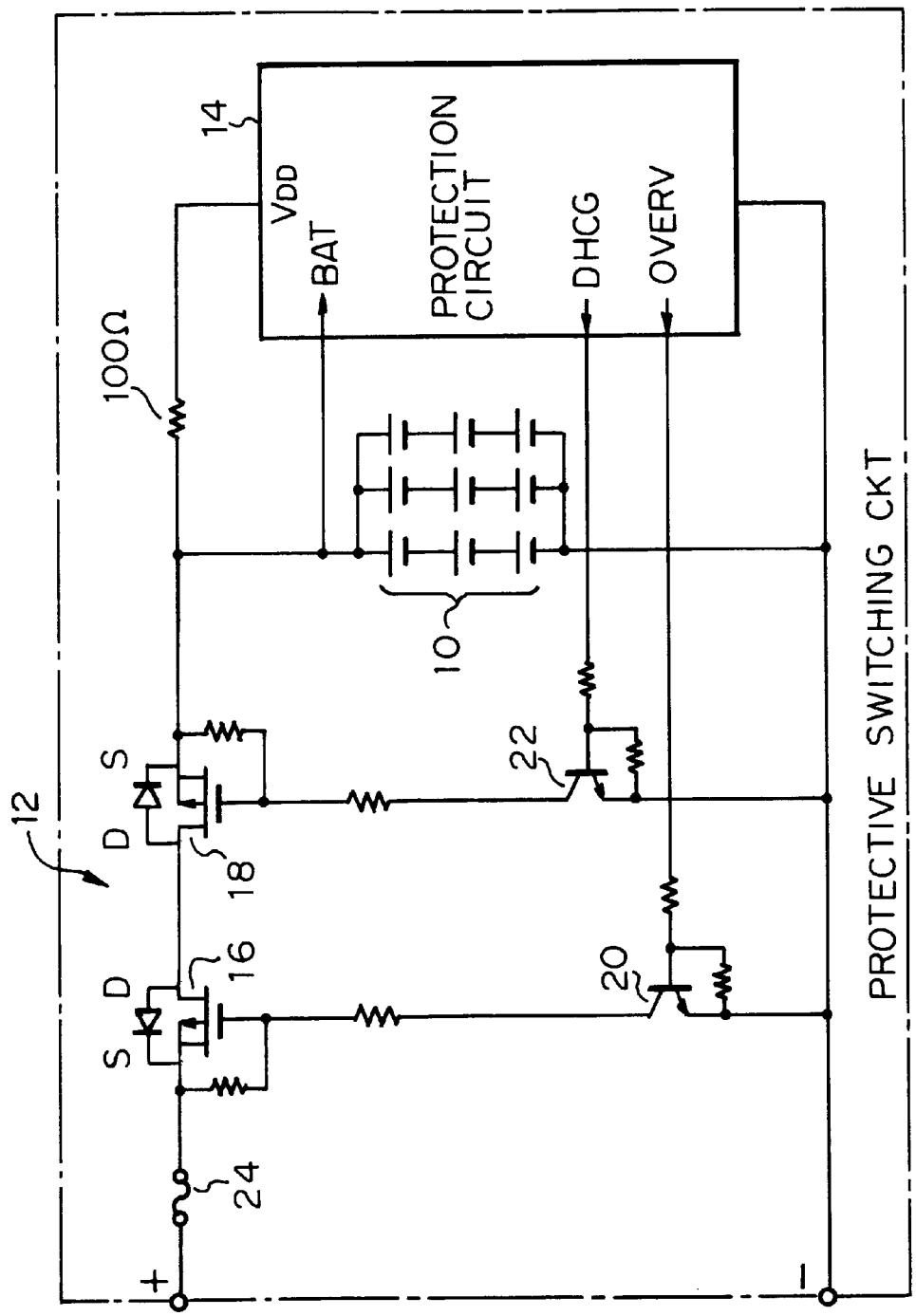
FIG. 2 is a block diagram schematically showing a specific configuration of a secondary battery applicable to the charging apparatus shown in FIG. 1.

As shown in FIG. 2, the secondary battery is implemented as a battery pack having a battery body 10, a protective switching circuit 12, and a protection circuit 14. The battery body 10 is implemented as three sets of three lithium ion batteries the three lithium ion batteries of each set being connected in series, the three sets of lithium ion batteries being connected in parallel, as illustrated. The individual battery has a charging capacity of 1,300 mAh and reaches its fully charged condition at or around 4.2 V. An overcharge inhibition voltage of 4.3 V (minimum value) is assigned to the individual battery. Therefore, in the illustrative embodiment, the fully charged state of the battery pack is selected to be 12.6 V in total, and a charge voltage less than 12.9 V can be applied.

The protective switching circuit 12 is a safety implementation for preventing the battery body 10 from being overcharged or overdischarged. The switching circuit 12 has a first and a second FET (Field Effect Transistor) switch 16 and 18 and a first and a second transistor switch 20 and 22. The FET switches 16 and 18 are serially connected to a charge/discharge path extending between the positive side of the battery body 10 and a positive charge/discharge terminal (+). The transistors switches 20 and 22 selectively turn on or turn off the FET switches 16 and 18, respectively. The first FET switch 16 is a switching device for shutting off the path in the charging direction in the event of overcharge. While the FET switch 16 is in its OFF state, it allows a current to flow in the discharging direction via its parasitic diode. The second FET switch 18 is a switching device for shutting off the path in the discharging direction at the time of overdischarge. While the FET switch 18 is in its OFIF state, it allows a current to flow in the charging direction via its parasitic diode.

The first transistor switch 20 is connected between the gate of the first FET switch 16 and a negative charge/discharge terminal (−). When the transistor switch 20 is turned on under the control of the protection circuit 14, it turns off the FET switch 16. Likewise, the second transistor switch 22 turns off the second FET switch 18 under the control of the protection circuit 14. A fuse 24 is connected between the positive terminal (+) and the FET switch 16. The fuse 24 melts in response to an unusual current for further promoting the protection of the battery body 10 against unusual charging and other undesirable occurrences.

The protection circuit 10 detects a fault ascribable to overcharge or overdischarge by referencing the terminal voltage of the battery body 10. Upon detecting a fault, the protection circuit 10 turns on the transistor 20 or 22 and thereby turns off the FET switch 16 or 18, respectively. In this sense, the protection circuit 10 plays the role of a detection circuit for obviating overcharge to or overdischarge from the battery body 10. The protection circuit 10 includes a battery voltage input terminal BAT, an overdischarge control output terminal DHCG, and an overcharge control output terminal OVERV.

As shown in FIG. 1, the charging apparatus embodying the present invention includes a DC/DC converter 30, a charge switching circuit 32, a voltage control circuit 34, a current limiting circuit 36, and a main control circuit 38. A power supply is connected to the input side of the DC/DC converter 30 via, e.g., an AC adapter. The secondary battery described with reference to FIG. 2 is connected to0 positive and negative charging terminals (+) and (−).

The DC/DC converter 30 serves as a DC power feed ing circuit for converting a DC current and a DC voltage fed from, e.g., the AC adapter to a preselected voltage and a preselected current, respectively. For example, the converter 30 may advantageously be implemented by one capable of lowering a DC voltage of about 16 V input via the AC adapter to a voltage between 12.5 V to 13.0 V . In the illustrative embodiment, the converter 30 has a feedback terminal PB to which voltages are fed back from the voltage control circuit 34 and current limiting circuit 36. The converter 30 is therefore capable of adjusting its output voltage and output current in accordance with the above feedback voltages.

The charge switching circuit 32 selectively turns on or turns off the output of the DC/DC converter 30. In the illustrative embodiment, the charge switching circuit 32 is made up of a first and a second PET switch 322 and 324 and a first and a second transistor switch 326 and 328. When the PET switches 322 and 324 are held in their ON state, they transfer the output of the DC/DC converter 30 to a charging path. The first FET switch 322 in its OFF state shuts off a discharging path from the secondary battery while the second PET switch 324 in its OFF state shuts off a path in the charging direction. In the illustrative embodiment, during constant current charging which will be described, the FET switches 322 and 324 play the role of pulse switches for switching a charge current output from the DC/DC converter 30 in the form of pulses. The first transistor switch 326 is connected to the gate of the first FET switch 322 while the second transistor switch 328 is connected to the gate of the second FET switch 324.

The first transistor switch 326 selectively turns on or turns off under the control of the main control circuit 38; the switch 326 turns off the first FET switch 322 in its ON state. Likewise, the second transistor switch 328 selectively turns on or turns off the second FET switch 324 under the control of the main control circuit 38. The bases of the transistors 326 and 328 both are connected to a control line extending from the main control circuit 38, causing the FET switches 322 and 324 to turn on or turn off at the same time.

The voltage control circuit 34 is a voltage setting circuit for controlling the output voltage of the DC/DC converter 30 to a preselected voltage. In the illustrative embodiment, the circuit 34 is capable of controlling the converter output voltage to either one of a first and a second voltage. The second voltage is lower than the overcharge voltage of the secondary battery, but higher than the full charge voltage of the same, e.g., 12.76 V. The first voltage is lower than the second voltage and corresponds to the full charge voltage of the secondary battery, e.g., 12.6 V.

Specifically, the voltage control circuit 34 has a transistor switch 342 selectively turning on or turning on under the control of the main control circuit 38, and a comparator 344 for comparing t h e output of the transistor switch 342 and a reference voltage Vref. The output of the DC/DC converter 30 is connected to the collector of the transistor switch 342 via resistors R1 and R2. A resistor R3 is connected between the collector and the emitter of the transistor 342. While the transistor switch 342 is in its OFF state, the resistors R1, R2 and R3 are connected in parallel to the DC/DC converter 30. As a result, the previously mentioned first voltage is set up by the sum of the resistances of the resistor R1, R2 and R3. On the turn-on of the transistor 342, the third resistor R3 is shorted while the resistors R1 and R2 are connected in parallel to the DC/DC converter 30, so that the second voltage is set up by the combined resistance of the resistors R1 and R2. For example, assume that the reference voltage Vref is 2.5 V, and that the resistors R1, R2 and R3 have resistances of 16 kΩ, 3.9 kΩ and 60 kΩ, respectively. Then, the first and second voltages of 12.6 V and 12.7 V, respectively, are set up.

The reference voltage Vref is applied to the non-inverting input of the comparator 344 while the voltage output from the resistor R1 and divided by the resistors R2 and R3 or by the resistor R2 is applied to the inverting input of the comparator 344. The comparator 344 amplifies a difference between the two input voltages and feeds the amplified difference to the feedback terminal FB of the DC/DC converter 30. For example, when the transistor 342 is in its OFF state, the converter output voltage is divided by the resistor R1 and resistors R2 and R3. The comparator 344 compares the resulting voltage and the reference voltage Vref of 2.5 V and feeds back their difference to the feedback terminal FB of the converter 30, thereby setting up a voltage of substantially 2.5 V. Likewise, when the transistor 342 is in its ON state, the converter output voltage is divided by the resistors R1 and R2; the comparator 344 feeds back a difference between the resulting voltage and the reference voltage Vref so as to set up a voltage of substantially 2.5 V. In response, the converter 30 adjusts its output voltage and accurately outputs the first voltage or the second voltage.

The current limiting circuit 36 serves as a current setting circuit for limiting the output current of the DC/DC converter 30 to a preselected value. In this embodiment, the current limiting circuit 36 is capable of limiting the above current to either one of a first current and a second current. Assume that the individual battery has a charging capacity of 1,300 mAh, as stated earlier. Then, the first current may be selected to be 2.5 A which is 0.64C of 3,900 mA (=1.0C) in the constant current charging range. The second current is lower than the first current and may be selected to be 1.5 A which is about 0.4C, i.e., a current to appear in the fully charged state. In a bilevel pulse charging range which will be described, the first and second currents are set alternatively in the form of pulses. In the illustrative embodiment, the current limiting circuit 36 is connected to the negative charge terminal (−) and made up of resistors R4, R5, R6, R7 and R8, a transistor switch 362, and a comparator 364. The resistor R4 is serially connected to, e.g., the charging path in order to sense a charge current. The resistors R5–R8 divide the reference voltage Vref so as to set up the first current. The transistor switch 362 is used to connect the resistors R5 and R6 in parallel in order to set up the second current. The comparator 364 compares a charge current and a reference value produced by dividing the combined resistance and resistors R7 and R8, and feeds back the resulting difference to the DC/DC converter 30.

More specifically, the transistor switch 362 selectively turns on or turns off under the control of the main control circuit 38. The collector of the transistor switch 362 is connected to the resistor R6 branching off between the resistors R5 and R7. When the transistor switch 362 is in its OFF state, the charge current is limited to the first current by the resistor R4. Upon the turn-on of the transistor 362, the charge current is further limited to the second current due to the division ratio between the resistors R5–R8. In the illustrative embodiment, the resistors R4–R6 are respectively provided with resistances of 0.039 Ω, 470 Ω and 750 Ω, so that the first and second currents are respectively limited to 2.4 A and 1.5 A.

The comparator 364 has a noninverting input and an inverting input. The noninverting input is connected to the reference voltage Vref via the resistor R8 which is connected to a potential produced by dividing the voltage Yref by the resistors R5–R7 and resistor R8. The inverting input is directly connected to the negative charge terminal (−). The comparator 364 compares the two input voltages and feeds back the result of comparison to the DC/DC converter 30.

The main control circuit 38 controls the charge switching circuit 32, voltage control circuit 34 and current limiting circuit 36 in accordance with the charging condition of the secondary battery. The main control circuit 38 includes a first voltage sensing section 382 for sensing the output voltage of the DC/DC converter 30. A switch controlling section 384 controls the charge switching circuit 32. A charge voltage setting section 386 controls the voltage control circuit 34 while a charge current setting section 388 controls the current limiting circuit 36. A current sensing section 390 senses the charge current. A second voltage sensing section 392 senses the battery voltage.

The first voltage sensing section 382 is connected to the output of the DC/DC converter 30 and includes an analog-to-digital converter (ADC) for digitizing the output voltage of the converter 30. The voltage sensing section 382 determines whether or not the sensed voltage is adequate. If the sensed voltage is not adequate, the voltage sensing section 382 drives a charge stop switch, not shown, or turns off the charge switching circuit 32 via the switch control section 384.

The switch control section, or switch drive section, 384 is connected to the bases of the transistors 326 and 328 of the charge switching circuit 32. The switch control section 384 selectively causes the voltages on the above bases to go high or low so as to shut off or set up the charge path, thereby driving the FET switches 322 and 324 on the charging path. In the illustrative embodiment the switch control section 384 includes a timer 400 in order to turn on the FET switches 322 and 324 at an ON duty ratio of 90% in the constant current charging range. In the bilevel pulse charging range, the switch control section 384 shuts off the charging path at preselected intervals when the second voltage sensing section 392 senses the battery voltage.

The charge voltage setting section 386 is connected to the base of the transistor switch 342 of the voltage control circuit 34. The setting section 386 selectively causes the base voltage of the transistor switch 342 to go high or low so as to turn on or turn off the transistor 342. As a result, the charge voltage is controlled to either one of the first and second voltages. In the illustrative embodiment, the setting section 386 includes a timer 402 interlocked to a timer 404 included in the charge current setting section 388 which will be described. In the pulse charging range, the timer 402 is used to set up the first voltage higher than the full charge voltage of the secondary battery. In the bilevel pulse charging range, the timer 402 is used to set up the first voltage in association with the first current or set up the second voltage in association with the second current.

The charge current setting section 388 is connected to the base of the transistor switch 362 of the current limiting circuit 36. The setting section 388 selectively causes the base voltage of the transistor switch 362 to go high or low so as to turn on or turn off the transistor 362, thereby setting up the first current or the second current. Basically, the setting circuit 388 should only maintain the first current until the battery voltage reaches its full charge voltage, and then repeatedly turn on and turn off the transistor 362 so as to set up the first and second currents alternately (bilevel pulse charging). However, in the illustrative embodiment, it is more preferable to set the timer 404 such that the ratio of the duration of the first current to that of the second current is, e.g., 9:1.

The charge current sensing section 390 is connected to the negative charge terminal (−) in order to sense the charge current. The sensing section 390 includes an ADC for digitizing the sensed charge current. On detecting an unusual current, the sensing section 390 drives the charge stop switch, not shown, or turns off the charge switch.

The second voltage sensing section 392 is connected to the positive charge terminal (+). The sensing section 392 senses the terminal voltage of the secondary battery when the FET switches 322 and 324 of the charge switching circuit 32 are turned off or when the secondary battery is newly connected to the charging apparatus. The sensing section 392 includes an ADC for digitizing the sensed voltage. When the secondary battery is brought into connection with the charging apparatus, the sensing section 392 determines whether or not the voltage of the battery is of a chargeable level. If the battery is chargeable, the sensing section 392 allows the charging apparatus to start charging the battery.

Figure 3A:
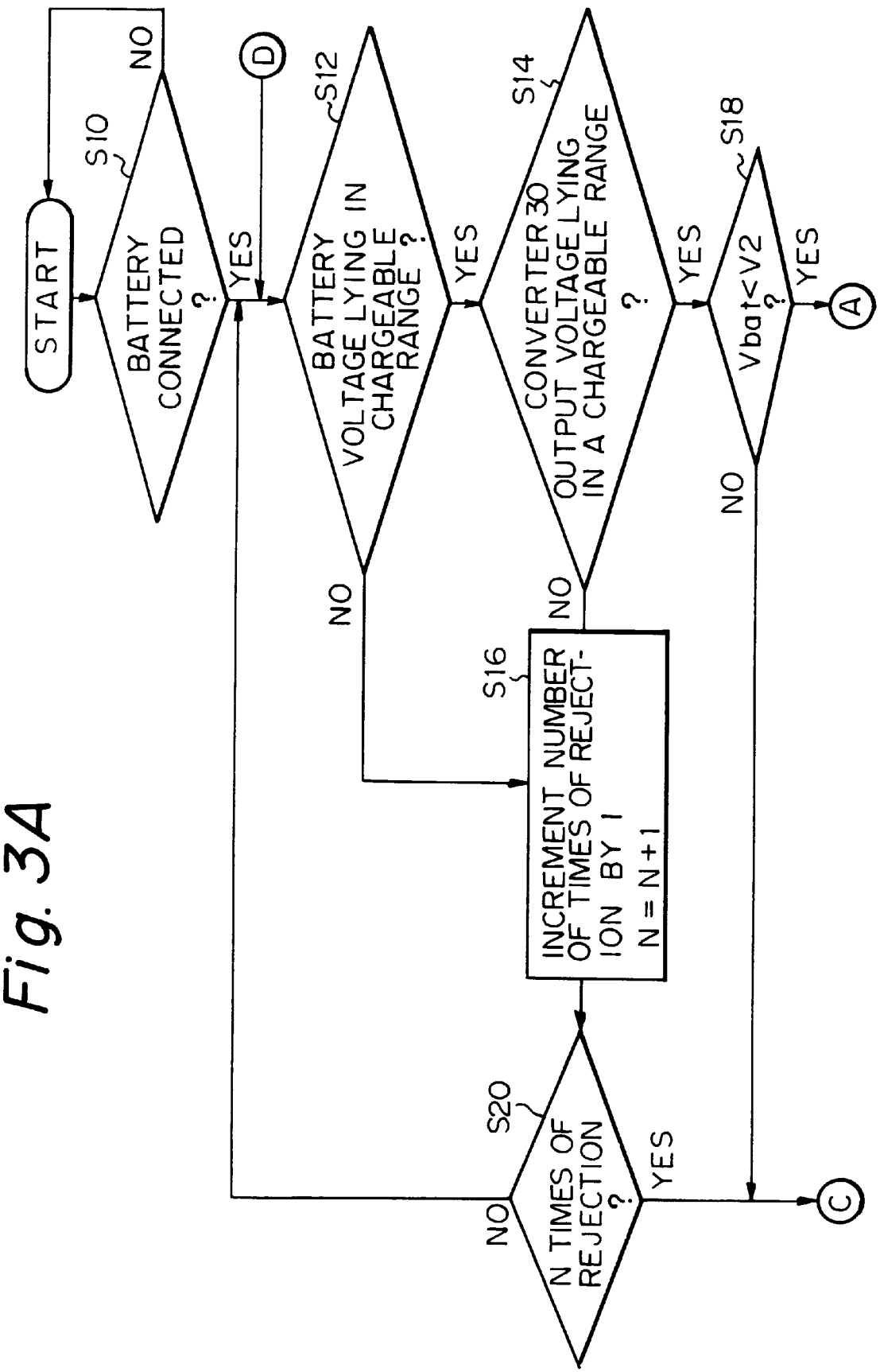
FIGS. 3A, 3B, 4A, 4B, 5, 6A and 6B are flowcharts demonstrating, in combination, a charging procedure practicable with the charging apparatus shown in FIG. 1.

A charging method practicable with the above illustrative embodiment will be described with reference to FIGS. 3A–7. As shown in FIG. 3A, the main control circuit 38 determines whether or not the secondary battery is connected to the charging apparatus (step S10). If the answer of the step S10 is negative (NO), the control circuit returns. If the answer of the step S10 is positive (YES), the control circuit 38 causes the second voltage sensing section 392 to sense the terminal voltage of the battery to see if it lies in a chargeable range or not (step S12). The control circuit 38 executes a step S14 if the answer of the step S12 is YES or executes a step S16 if otherwise. In the step S14, the control circuit 38 causes the first voltage sensing section 382 to sense the output voltage of the DC/DC converter 30 and determine whether or not it is a chargeable voltage. If the answer of the step S14 is YES, the control circuit 38 executes a step S18.

Assume that the answer of the step S12 or that of the step S14 is NO, meaning that charging is rejected. Then, the control circuit 38 increments the number of times of rejection by 1 (one) (step S16) and then determines whether or not it has reached a preselected number of times N (step S20). If the answer of the step S20 is NO, the control circuit 38 again executes the steps S12 and S14. If the answer of the step S20 is YES, the control circuit 38 turns off the charge switching circuit 32 (step S22, FIG. 3B) and then displays an alarm message (step S24).

In the step S18, the control circuit 38 determines whether or not the sensed battery voltage Vbat is lower than a maximum charge voltage V2. If the answer of the step S18 is NO, meaning that the battery voltage Vbat is higher than or equal to the maximum charge voltage V2, the control circuit 38 again turns off the charge switching circuit 32 (step S22) and displays an alarm message (step S24).

Figure 5:
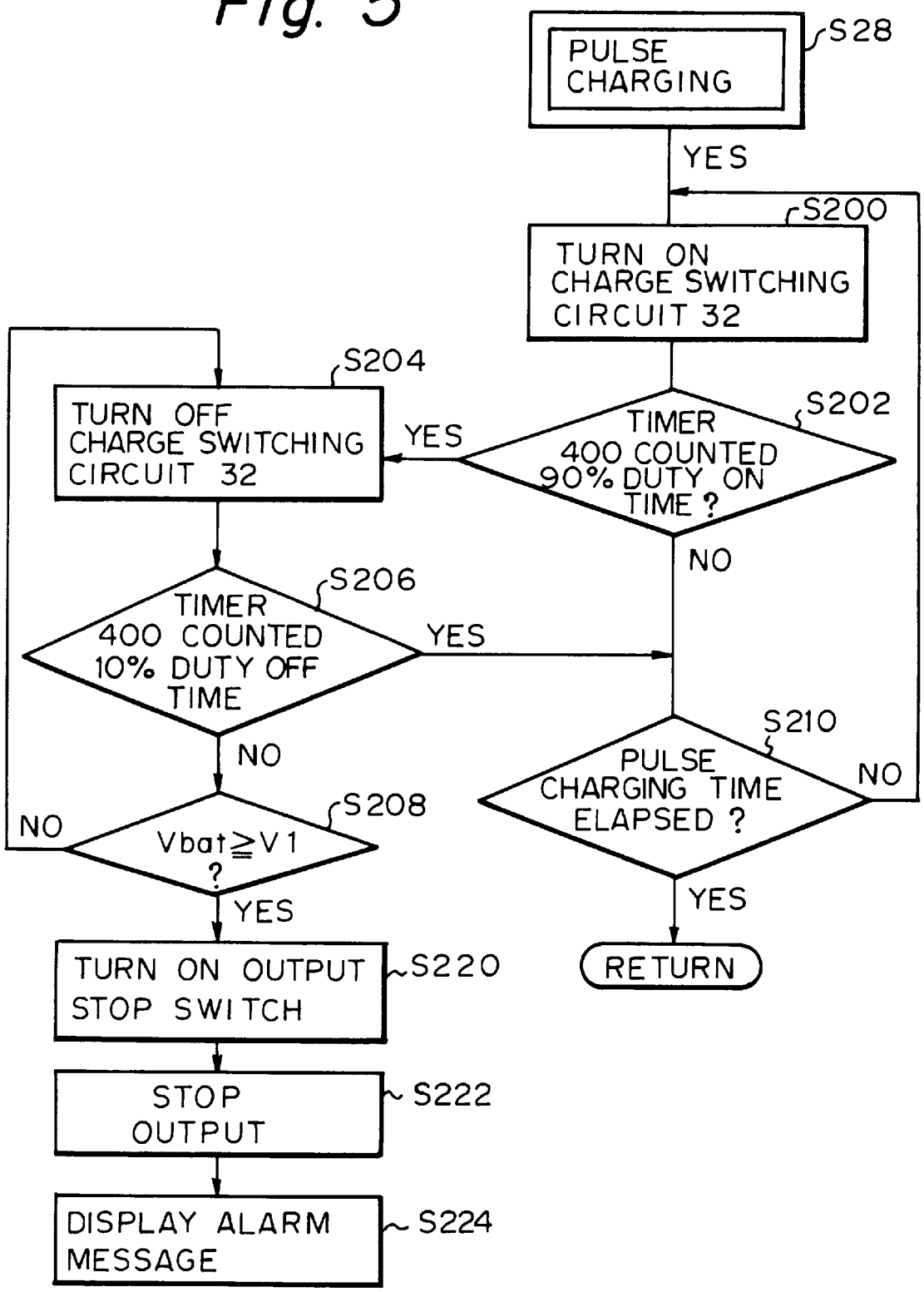

If the answer of the step S18 is YES, the control circuit 38 turns on the charge switching circuit 32 (step S26) and then executes pulse charging (step S28). FIG. 5 shows the pulse charging step S28 in detail. As shown, the control circuit 38 turns on the charge switching circuit 32 (step S200) and then turns on the timer 340 of the switch control section 400. As a result, the apparatus starts charging the secondary battery. At this instant, both the transistor 342 of the voltage control circuit 34 and the transistor 362 of the current limiting circuit 36 are held in their OFF state, so that the DC/DC converter 30 outputs the first voltage and first current.

After the step S200, the control circuit 38 determines whether or not the timer 400 of the switch control section 384 has counted up a preselected 90% duty ON time (step S202). If the answer of the step S202 is YES, the control circuit 38 turns off the charge switching circuit 32 (step S204) and then determines whether or not the timer 400 has counted up a preselected 10% duty OFF time (step S206). At this instant, the control circuit 38 causes the second voltage sensing section 392 to sense the battery voltage Vbat so as to see if it is higher than or equal to a full charge voltage V1 or not (step S208). If the answer of the step 208 is NO, the control circuit 38 returns to the step S204 and waits until the 10% duty OFF time elapses, while maintaining the switching circuit 32 in its OFF state. On the elapse of the OFF time (YES, step S206), the control circuit 38 determines whether or not the preselected pulse charging time has elapsed (step S210). If the answer of the step S210 is NO, the control circuit 38 returns to the step S200. Thereafter, the control circuit 38 repeatedly executes the steps S200–S210, i.e., repeats pulse charging with the ON duty of 90% until the pulse charging time elapses.

Assume that the battery voltage Vbat exceeds the voltage V1 before the preselected pulse charging times elapses (YES, step S208). Then, the control circuit 38 drives an output stop switch, not shown, (step S220), stops the output (step S222), and displays an alarm message (step S224).

Figure 3B:
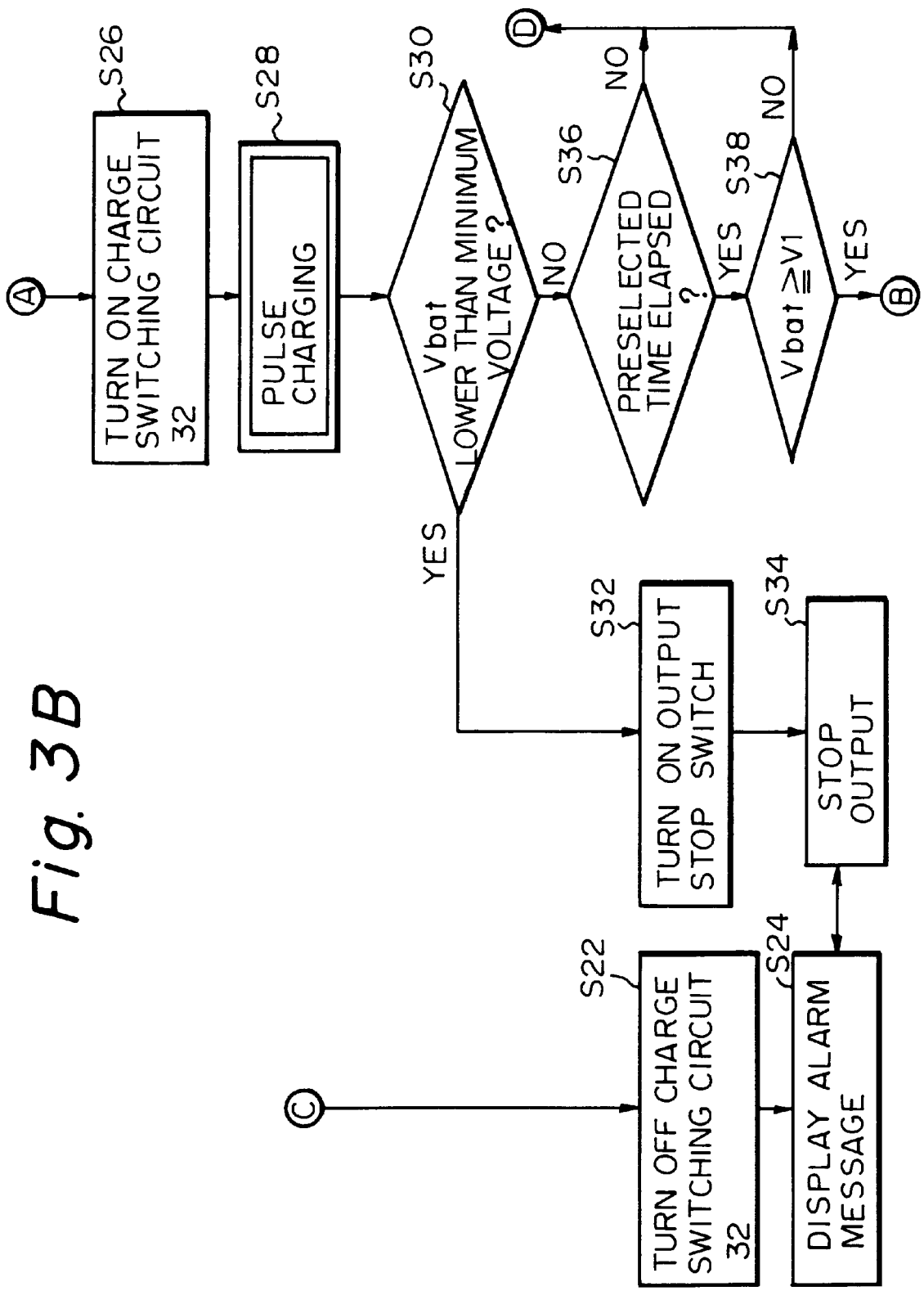

When the preselected charging time elapses (YES, step S210), the control circuit 38 returns to the routine shown in FIG. 3B. The control circuit 38 determines whether or not the battery voltage Vbat is lower than the minimum voltage (step 530). If the answer of the step S30 is YES, the control circuit 38 turns on the output stop switch (step S32), stops the output (step S34), and displays an alarm message (step S24).

If the answer of the step S30 is NO, the control circuit 3 8 determines whether or not a preselected period of time has elapsed (step S36). If the answer of the step S36 is NO, the control circuit 38 returns to the step S12 and repeats the steps S12–S36. On the elapse of the preselected period of time (YES, step S36), the control circuit 38 determines whether or not the battery voltage Vbat is higher than or equal to the full charge voltage V1 (step S38). If the answer of the step S38 is NO, the control circuit 38 returns to the step S12 and repeats the steps S12–S36. If the answer of the step S38 is YES, the operation is transferred to a step S39 shown in FIG. 4A.

Figure 4A:
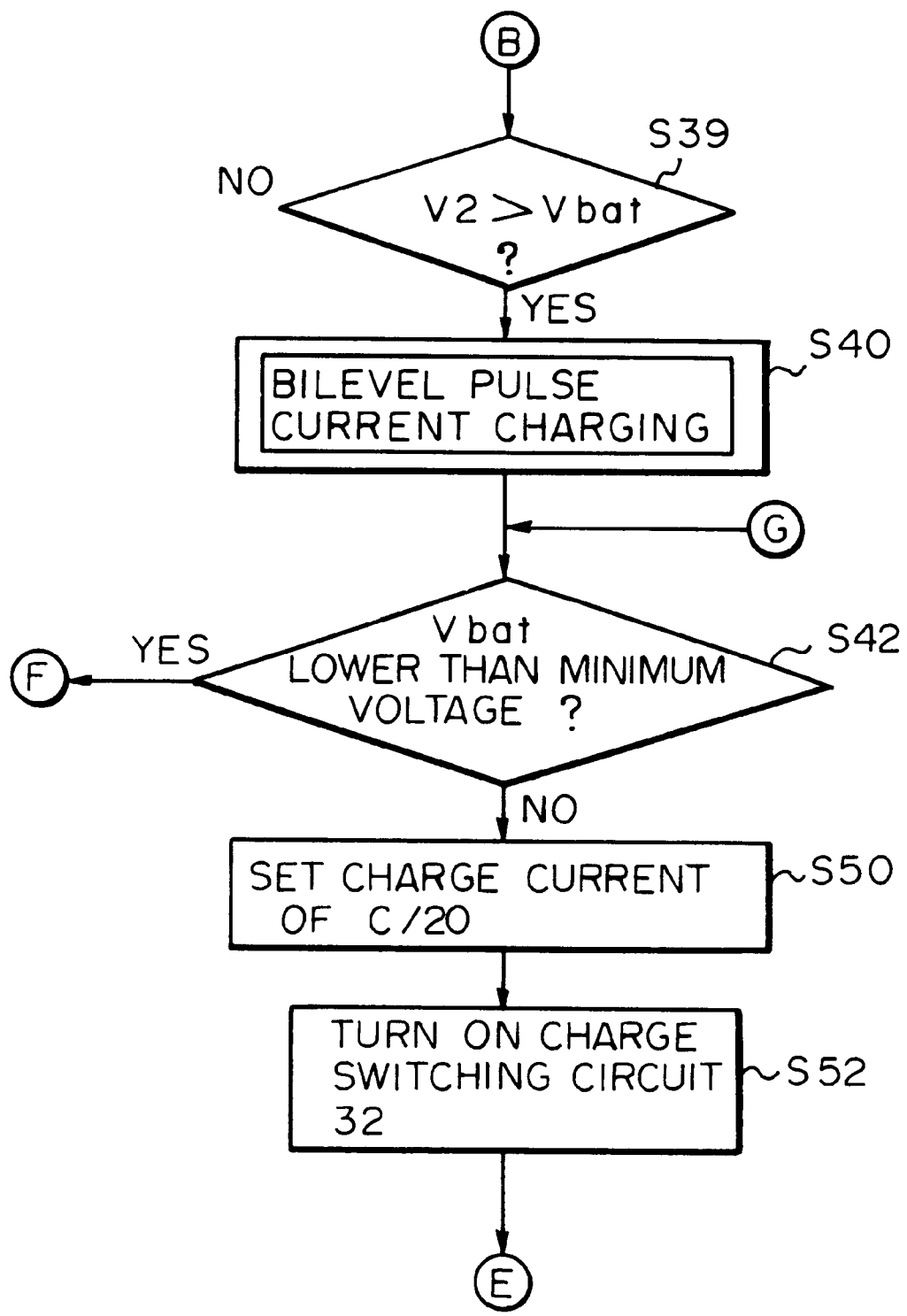
Figure 4B:
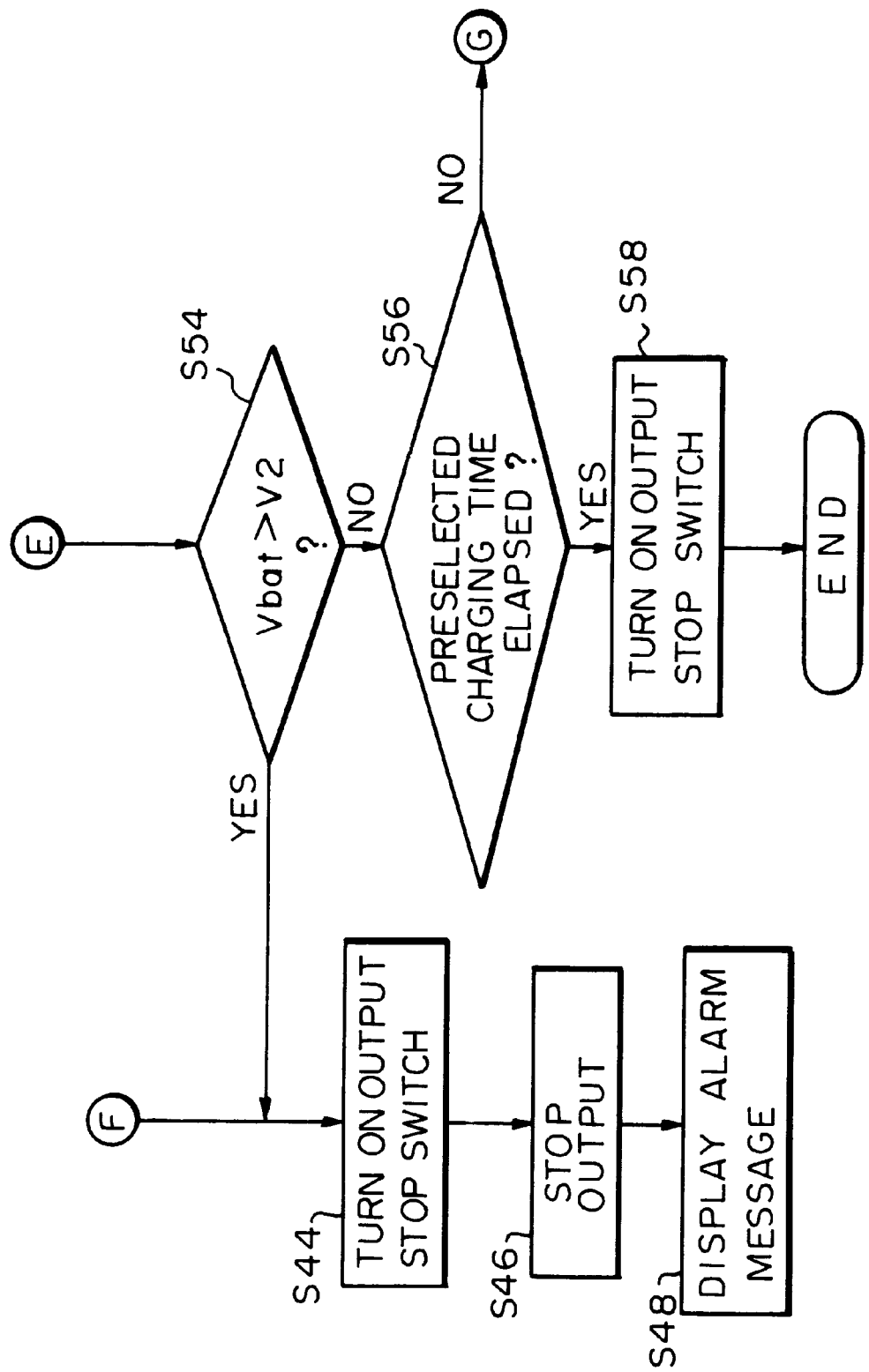

In the step S39 of FIG. 4A, the control circuit 38 determines whether or not the battery voltage Vbat is lower than the maximum charge voltage V2. If the answer of the step S39 is YES, the control circuit 38 executes a bilevel pulse current charging step S40.

Figure 6A:
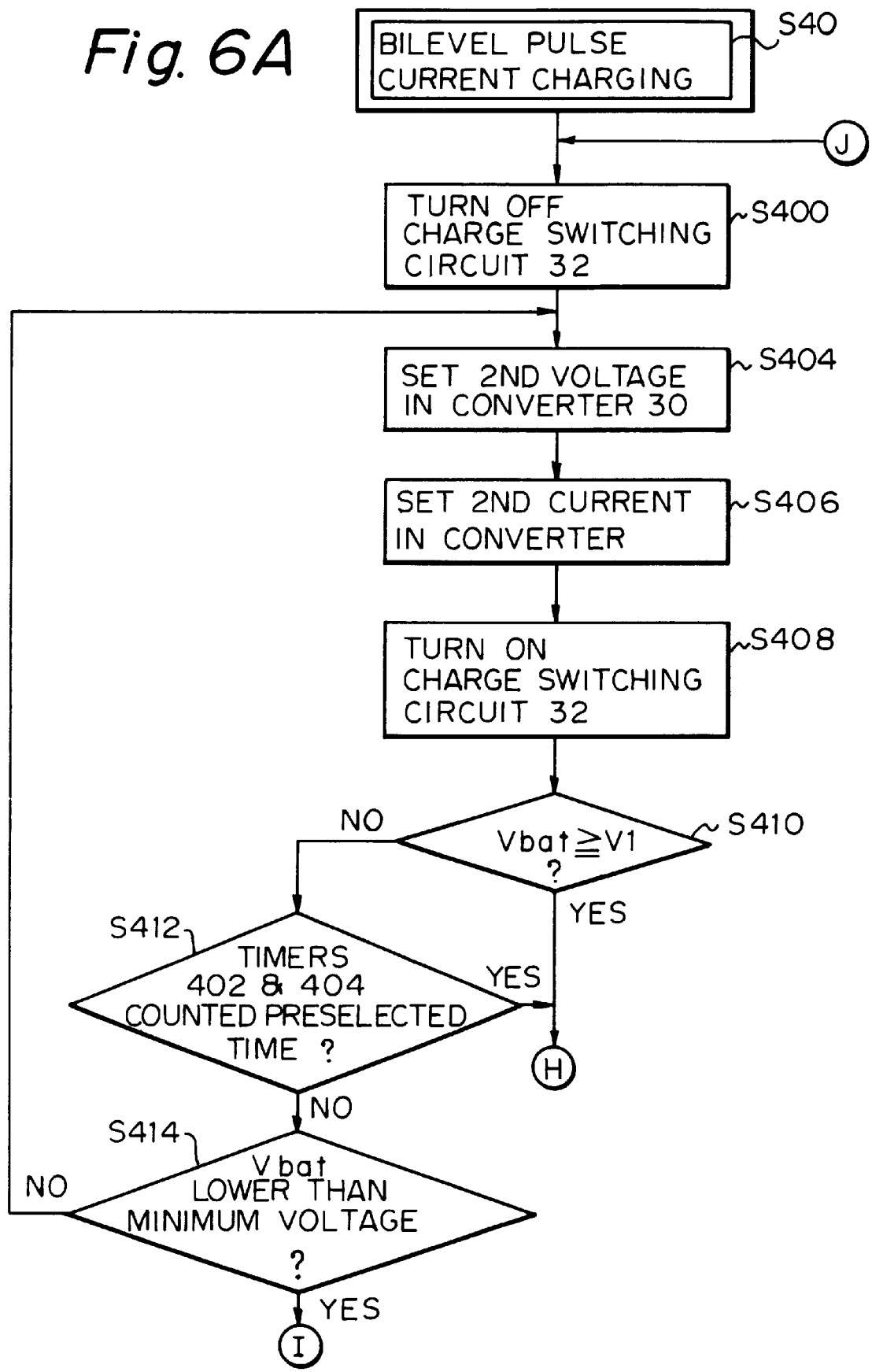
Figure 6B:
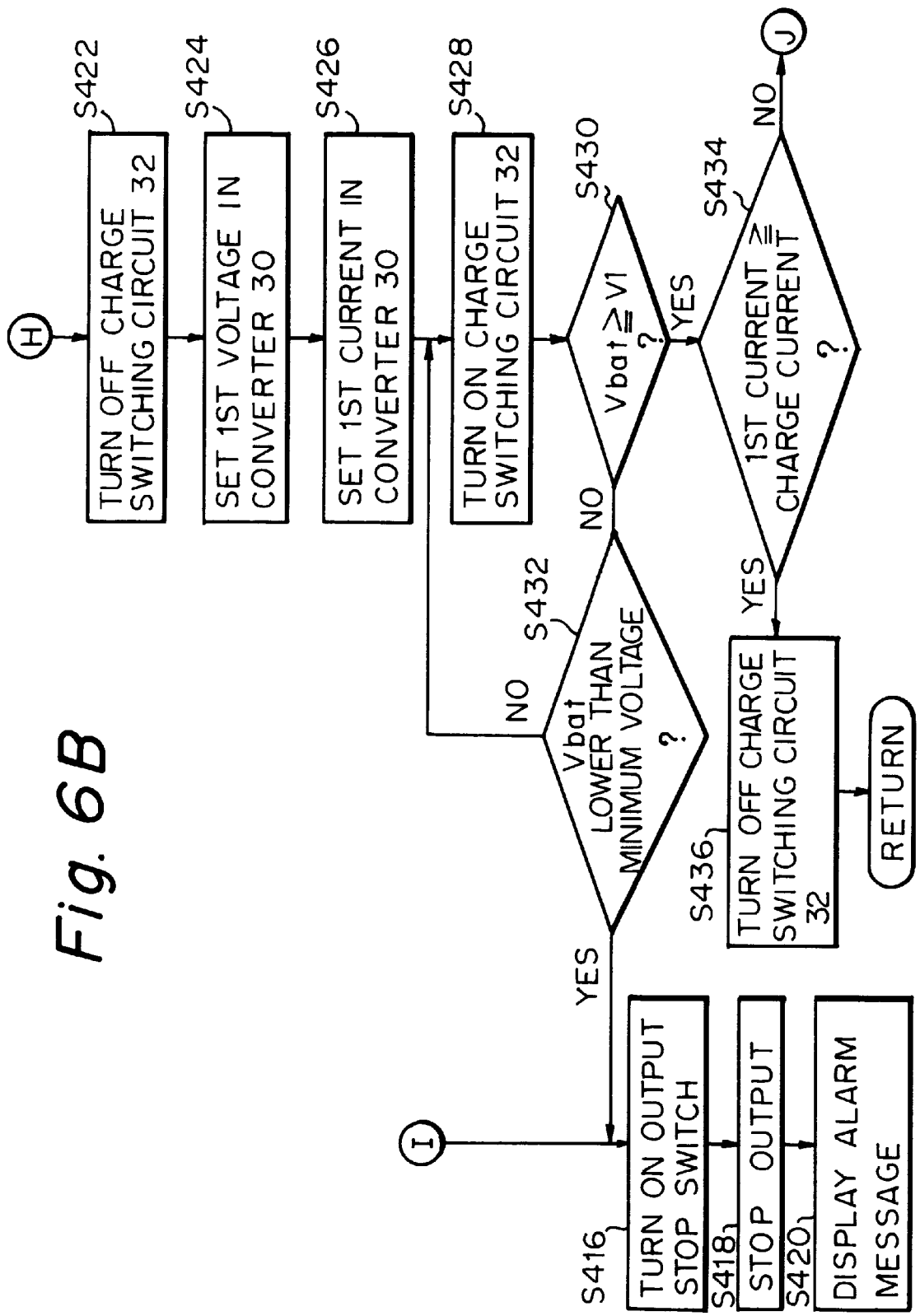

FIGS. 6A and 6B show the bilevel pulse charging step S40 in detail. As shown, the control circuit 38 turns off the charge switching circuit 32 having charged the secondary battery with the first current during pulse charging (step S400). Then, the control circuit 38 turns on the transistor switch 432 of the voltage control circuit 38 and thereby switches the output voltage of the DC/DC converter 30 from the first voltage to the second voltage (step 404). Subsequently, the control circuit 38 turns on the transistor switch 362 of the current limiting circuit 36 so as to switch the charge current from the first current to the second current (step S406). Thereafter, the control circuit 38 turns on the charge switching circuit 32 (step S408). At this instant, in the control circuit 38, the comparator 344 of the voltage setting section 386 and the comparator 346 of the current setting section 388 are driven in interlocked relation to each other.

In a step S410 following the step S408, the control circuit 38 determines whether or not the battery voltage Vbat is higher than or equal to the full charge voltage V1. If the answer of the step S410 is NO, the control circuit 38 determines whether or not the timers 402 and 404 each has counted the preselected time (step S412). If the answer of the step S412 is NO, the control circuit 38 determines whether or not the battery voltage Vbat is lower than the minimum voltage (step S414). If the answer of the step S414 is YES, the control circuit 38 turns on the output stop switch (step S416), stops the output (step S418), and displays the alarm message (step S420).

If the answer of the step S414 is NO, the control circuit 38 returns to the step S404 and repeats the steps S404–S412.

When the battery voltage Vbat exceeds the full charge voltage V1 (YES, step S410) or when the preselected period of time elapses (YES step S412), the control circuit 38 executes the following procedure.

The control circuit 38 turns off the switching circuit 32 (step S422). Then, the control circuit 38 turns off the transistor 342 of the voltage control circuit 34 so as to again switch the output voltage of the DC/DC converter 30 from the second voltage to the first voltage (step S424). Subsequently, the control circuit 38 turns off the transistor 362 of the current control circuit 36 so as to again switch the charge current from the second current to the first current (step S426). Thereafter, the control circuit 38 turns on the charge switching circuit 32 (step S428).

The step S428 is followed by a step S430 in which the control circuit 38 determines whether or not the battery voltage Vbat is higher than or equal to the full charge voltage V1. If the answer of the step S430 is NO, the control circuit 38 determines whether or not the battery voltage Vbat is lower than the minimum voltage (step S432). If the answer of the step S432 is YES, the control circuit 38 repeats the steps S428 and S430 described previously. If the answer of the step S432 is NO, the control circuit 38 repeats the steps S428 and S430. When the battery voltage Vbat exceeds the full charge voltage V1 (YES, step S430), the control circuit 38 causes the current sensing section 390 to sense the charge current and determine whether or not it is lower than the first current set by the current limiting circuit 36, i.e., whether or not the first current is decreasing due to the progress of charging (step S434). if the answer of the step S434 is NO, the control circuit 38 returns to the step S400 and repeats the steps S400–S430, thereby further effecting the bilevel pulse charging.

If the answer of the step S434 is YES, meaning that the first current has started decreasing, the control circuit 38 turns off the charge switching circuit 32 (step S436) and returns to the routine shown in FIG. 4A.

Referring again to FIG. 4A, the control circuit 38 finishes the step S40 and determines whether or not the battery voltage Vbat is lower than the minimum voltage (step S42). If the answer of the step S42 is YES, the control circuit 38 turns on the output stop switch (step S44), stops the output (step S46), and displays an alarm message (step S48).

If the answer of the step S42 is NO, meaning that the battery voltage Vbat is not lower than the minimum voltage, the control circuit 38 sets a charge current of C/20 (step S50) and again turns on the charge switching circuit 32 (step S52). Subsequently, the control circuit 38 determines whether or not the battery voltage Vbat has exceeded the maximum charge voltage V2 (step S54). If the answer of the step S54 is YES, the control circuit 38 executes the steps S44–S48. If the answer of the step S54 is NO, the control circuit 38 determines whether or not the preselected charging time has elapsed (step S56). If the answer of the step S56 is NO, the control circuit 38 returns to the step S42 and repeats the steps S42–S56 so as to continue the charging operation. If the answer of the step S56 is YES, the control circuit 38 turns on the output stop switch (step S58) and then ends the charging operation.

Figure 7:
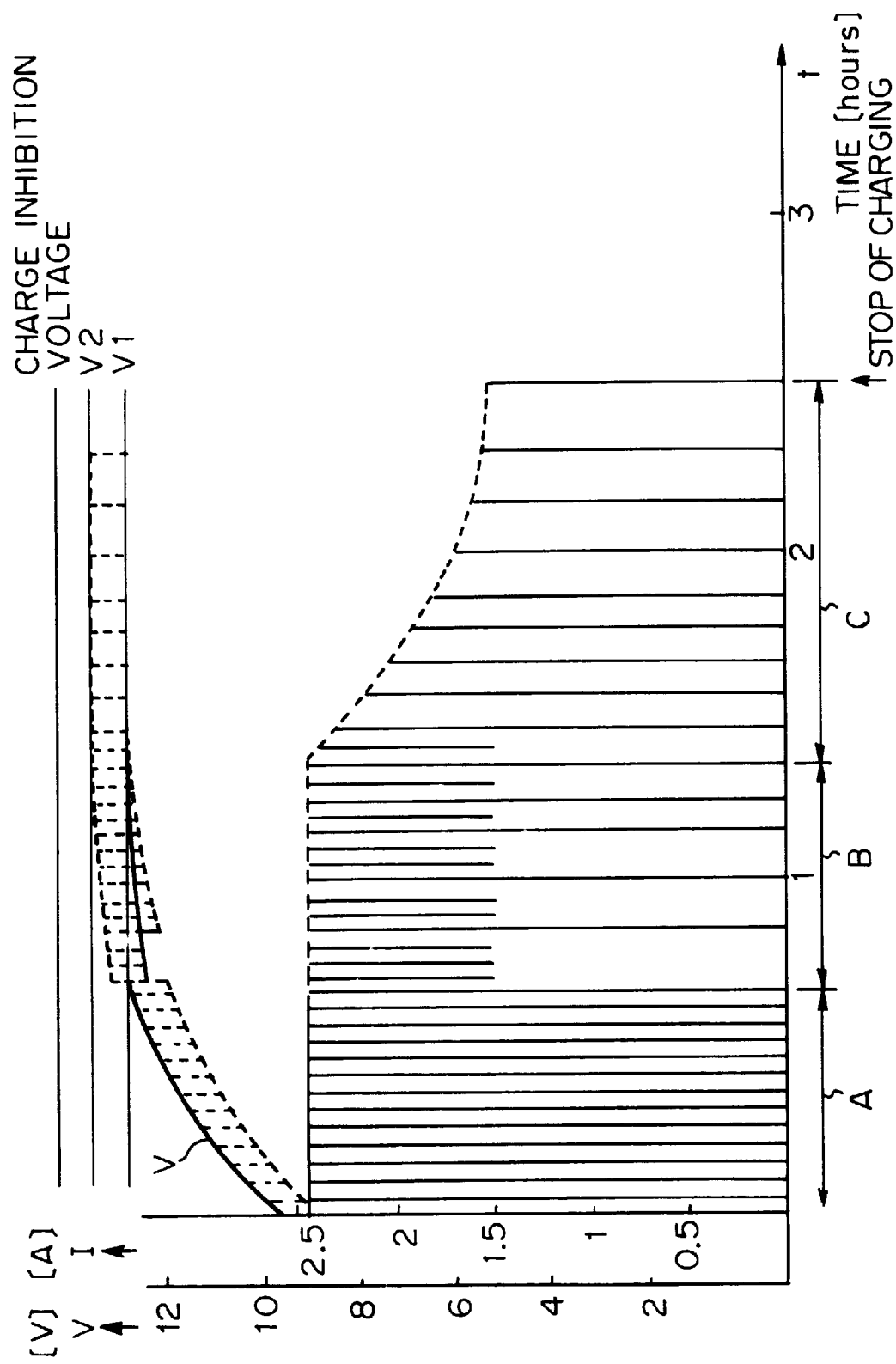
FIG. 7 shows a current waveform and a voltage waveform charging the secondary battery in the illustrative embodiment.

FIG. 7 shows waveforms representative of the charge current and charge voltage charging the secondary battery in the illustrative embodiment. In FIG. 7, the ordinate and abscissa respectively indicate the charge current and charge voltage and time. As shown, in the first range A, the first current of 0.64C is repeatedly turned on and turned off in order to charge the battery with a constant pulse current.

Figure 8:
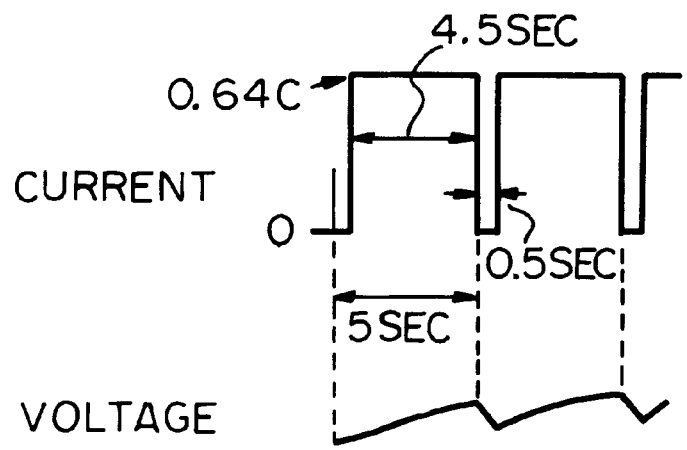
FIGS. 8–10 each shows a particular range of the waveforms of FIG. 7 in detail.

FIG. 8 shows a current waveform and a voltage waveform appearing in the first range A in detail. As shown, the current and voltage are controlled at a period of 5 seconds and an ON duty ratio of 90%. The battery voltage rises from, e.g., a little less than 10 V to about 12.6 V corresponding to the full charge voltage V1 over the first range A.

Figure 9:
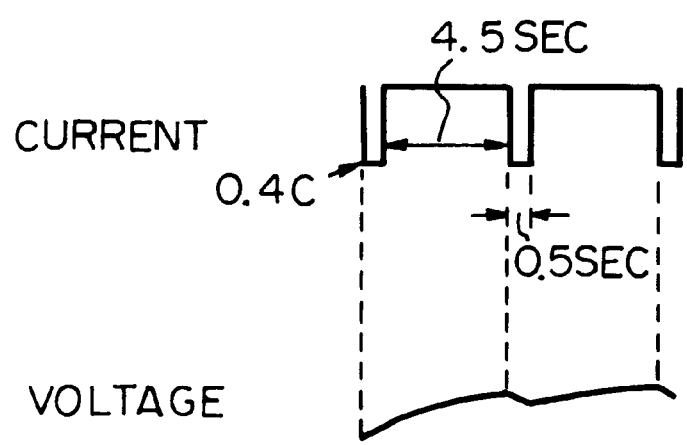

As soon as the battery voltage exceeds the full charge voltage V1, the first current and the second current of 0.4C are caused to appear alternately in the second range V, effecting the bilevel pulse charging. FIG. 9 shows a current waveform and a voltage waveform appearing in the second range V in detail. As shown, the ratio between the duration of the first current and that of the second current is controlled to 9:1. During this period of time, the mean battery voltage sequentially increases while repeatedly rising above and falling below the full charge voltage V1.

Figure 10:
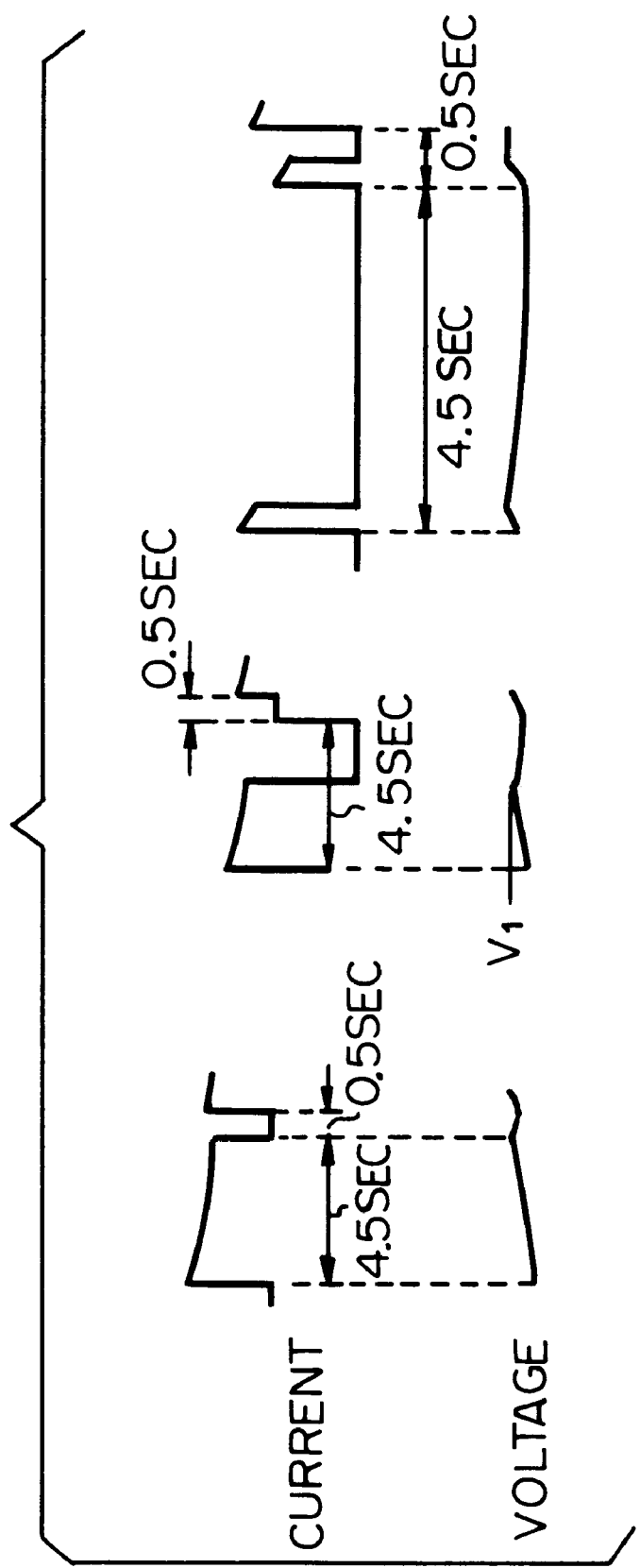

In the third range C in which the current decreases, the decreasing current is repeatedly turned on and turned off. The charging operation ends when the current substantially coincides with the second current. While the battery voltage approaches the maximum charge voltage V2 in the third range C, it coincides with the full charge voltage V1 at the end of the charging operation. As FIG. 7 indicates, the charging operation ends in approximately 2 hours and 30 minutes. FIG. 10 shows a current waveform and a voltage waveform appearing in the third range C in detail.

Figure 11:
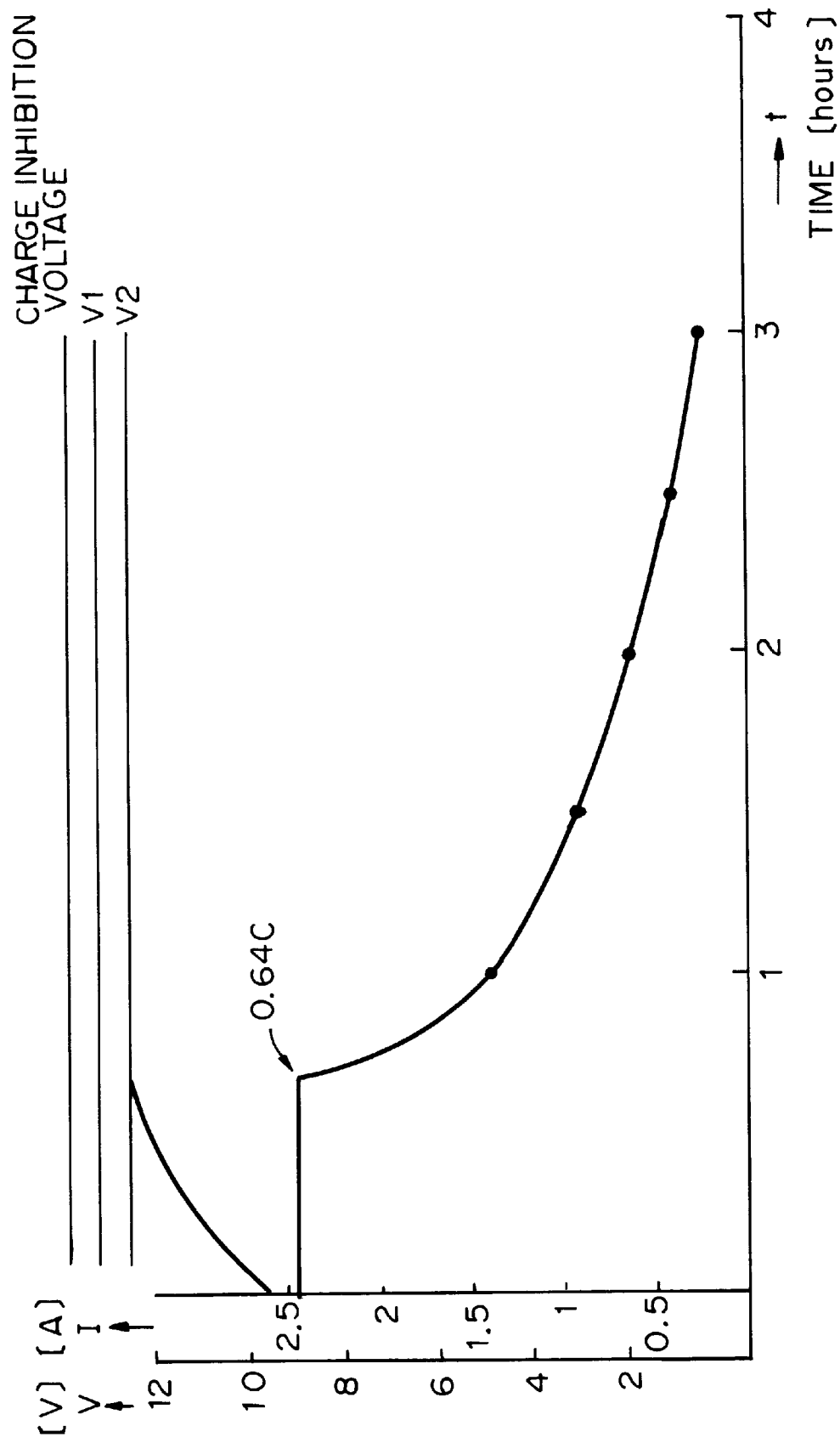
FIG. 11 shows a current waveform and a voltage waveform representative of a conventional charging method.

FIG. 11 shows a current waveform and a voltage waveform appearing when the above secondary battery is charged by the conventional constant current, constant voltage charging scheme. As shown, the conventional scheme starts charging the battery with a current of 0.64C equal to the first current of the illustrative embodiment, and continuously charges it in a constant current range. However, the battery voltage reaches the full charge voltage V1 in substantially the same period of time as in the illustrative embodiment. Thereafter, the current sequentially decreases while the battery voltage remains substantially constant. It needs almost 3 hours for the charging operation to complete.

As stated above, the illustrative embodiment charges the secondary battery with pulses having a 90% ON duty over the constant current range. This allows the battery voltage to reach the full charge voltage in substantially the same period of time as in the case of continuous constant current charging. Moreover, the embodiment turns off the switching devices arranged on the charging path periodically and thereby reduces loads on the switching devices and temperature rise of the same. After the pulse charging, the embodiment affects the bilevel pulse charging, i.e., applies the second current lower than the current in the constant current range and the first current in the constant current range alternately. This successfully increases the capacity to be fed to the battery, compared to the case wherein constant current charging is followed by constant voltage charging. As a result, the charging time is noticeably reduced. In addition, the embodiment efficiently applies the first voltage similar to the maximum charge voltage not exceeding the inhibition voltage, which would trigger the protection circuit of the battery, and the second voltage alternately. This effectively insures the safety of the secondary battery.

While the embodiment includes the voltage control circuit 42 for setting each of the first and second voltages in a particular charging range, the first and second voltages may be equal to each other, if desired. The present invention is practicable even without the voltage control circuit 42 or even if the first and second voltages are equal to each other.

In summary, in accordance with the present invention, a preselected current is repeatedly turned on and turned off for pulse charging until a battery voltage rises to a full charge voltage. Subsequently, a bilevel current is alternately applied for bilevel pulse charging. Consequently, charging time can be reduced without increasing loads on switches arranged on a charging path. Moreover, a voltage not triggering the projection function of a secondary battery is applied to the battery, thereby insuring the safety of the battery.

The entire disclosure of Japanese patent application No. 42659/1997 filed on Feb. 26, 1997 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. An apparatus for charging a secondary battery having a function of shutting off, upon detecting an overcharge voltage, a charging path to the batter to thereby obviate overcharging, comprising:

a DC power feeding circuit for feeding a preselected DC voltage and a preselected DC current for charging the secondary battery;

a switching circuit for pulsing an output of said DC power feeding circuit to thereby pulse switch a charge current for the secondary battery;

a first control circuit for controlling a DC voltage fed from said DC power feeding circuit to a preselected voltage lower than the overcharge voltage of the secondary battery;

a current limiting circuit for limiting a DC voltage fed from said DC power feeding circuit to a preselected current, said current limiting circuit being capable of selectively switching the DC current to at least a first current for a constant current range or a second current lower than said first current and corresponding to a current to appear at an end of a charging operation; and a second control circuit for controlling said switching circuit, said first control circuit and said current limiting circuit on a basis of a terminal voltage of the secondary battery, an output voltage of said DC power feeding circuit and a charge current to thereby control charging of the secondary battery;

said second control circuit causing said current limiting circuit to maintain said first current until the terminal voltage of the secondary battery reaches a full charge voltage, while causing said switching circuit to pulse said first current, and causing, upon detecting a rise of the terminal voltage to the full charge voltage, said current limiting circuit to switch said first current and said second current in a form of pulses to thereby charge the secondary battery with resulting bilevel pulse currents.

2. An apparatus in accordance with claim 1, wherein said second control circuit turns off, during charging with said bilevel pulse currents, in order to sense a terminal open voltage of the secondary battery.

3. An apparatus in accordance with claim 1, wherein said second control circuit ends charging when the charge current that is coincident with said first current decreases during charging using said bilevel pulse currents and coincides with said second current.

4. An apparatus in accordance with claim 1, wherein said switching circuit comprises:

a first switching device having a first parasitic diode for controlling a current from a secondary battery charging to flow via the first parasitic diode;

a second switching device having a second parasitic diode for shutting off a current from a secondary battery discharging to flow via the second parasitic diode; and a control device for selectively turning on or turning off each of said first switching device and said second switching device under control of said second control circuit.

5. An apparatus in accordance with claim 1, wherein said first control circuit comprises:

a control device for selectively controlling the output of said DC power feeding circuit to a first voltage lower than the overcharge voltage of the secondary battery, but higher than a full charge voltage to appear at an end of charging, or a second voltage lower than said first voltage and corresponding to the full charge voltage; and a comparing circuit for comparing an output of said control device and a preselected reference voltage, and feeding back a result of comparison to said DC power feeding circuit;

said control device being turned on and turned off by said second control circuit in order to set said first voltage in a constant current range in which the secondary battery is charged by said pulses of said first current, and to set said second voltage when a voltage of the secondary battery rises above the full charge voltage or to set said first voltage when the voltage of the secondary battery falls below the full charge voltage.

6. An apparatus in accordance with claim 5, wherein said DC power feeding circuit controls an output voltage thereof to a preselected value on a basis of a comparison result received from said first control circuit.

7. An apparatus in accordance with claim 1, wherein said current limiting circuit comprises:

a sense resistor positioned on a path for charging the secondary battery for sensing the charge current;

an operational amplifier for comparing a potential difference between opposite ends of said sense resistor and a voltage produced by dividing a reference voltage by resistors; and a feedback path for feeding back an output of said operational amplifier to said DC power feeding circuit.

8. An apparatus in accordance with claim 7, wherein said DC power feeding circuit controls an output current thereof to a preselected value on a basis of a comparison result received from said current limiting circuit.

9. An apparatus in accordance with claim 1, wherein said second control circuit comprises:

a first timer for turning on said switching circuit at a preselected duty ratio during charging using said first current; and a second timer for causing said first current and said second current to be switched at a preselected time ratio during charging using said bilevel pulse currents.

10. An apparatus in accordance with claim 9, wherein said first timer is provided with an ON duty ratio for turning on said switching circuit by more than 90% inclusive.

11. An apparatus in accordance with claim 9, wherein said second timer is set so as to provide said second current with a time ratio of less than 1.0 inclusive to said first current.

12. An apparatus in accordance with claim 9, wherein said second control circuit comprises an analog-to-digital converter for digitizing the terminal voltage of the secondary battery, the output voltage of said DC power feeding circuit, and the charge current detected.

13. A method of charging a secondary battery having a function of shutting off, upon detecting an overcharge voltage, a charging path to the battery to thereby obviate overcharging, comprising the steps of:

repeatedly pulsing a preselected first current, which starts decreasing when a terminal voltage of the secondary battery reaches a full charge voltage, until the terminal voltage reaches the full charge voltage, thereby charging the secondary battery;

replacing, upon detecting a rise of the terminal voltage to the full charge voltage, said preselected first current with a second current lower than said first preselected current and corresponding to a current to appear when fully charged, while again replacing said second current with said preselected first current when the terminal voltage falls below the full charge voltage, and pulsing said first preselected current and second current alternately, thereby further charging the secondary battery with bilevel pulse currents; and stopping charging the secondary battery when said preselected first current sequentially decreases to reach a value corresponding to said second current, determining that a charging operation has completed.

14. A method in accordance with claim 13, wherein in the pulsing step an ON duly ratio is greater than 90% inclusive.

15. A method in accordance with claim 13, wherein in the replacing step said second current has a time ratio of less than 1.0 inclusive to said preselected first current.

16. A method in accordance with claim 13, wherein in the replacing step a ratio between a duration of said preselected first current and a duration of said second current is variable.

17. A method in accordance with claim 13, wherein in the replacing step the current is pulsed at preselected intervals in order to sense the terminal voltage of the secondary battery.

18. A method in accordance with claim 13, wherein a second voltage is selected as a charge voltage during charging using said preselected first current, but is replaced with a first voltage during charging using said second current.

19. A method of charging a secondary battery having a function of shutting off, upon detecting an overcharge voltage, a charging path to the battery to thereby obviate overcharging, comprising the steps of:

repeatedly pulsing a preselected first current, which starts decreasing when a terminal voltage of the secondary battery reaches a full charge voltage, until the terminal voltage reaches a first voltage corresponding to the full charge voltage, thereby charging the secondary battery by pulse charging;

replacing, upon detecting a rise of the terminal voltage to said first voltage, said preselected first current with a second current lower than said preselected first current and corresponding to a current to appear when fully charged, while again replacing said second current with said preselected first current when the terminal voltage falls below the full charge voltage, and alternately switching said preselected first current and second current in a form of pulses, thereby further charging the secondary battery with bilevel pulse currents;

replacing, when the terminal voltage reaches a second voltage that is higher than said first voltage, but lower than the full charge voltage, said first preselected current with said second current, thereby further charging the secondary battery by pulse charging;

switching said first preselected current and said second current in a form of pulses, thereby further charging the secondary battery with bilevel pulse currents; and stopping charging when said preselected first current sequentially decreases to reach a value corresponding to said second current during pulse charging, determining that a charging operation has been completed.

20. A method in accordance with claim 19, wherein in the pulsing step an ON duty ratio is greater than 90% inclusive.

21. A method in accordance with claim 19, wherein in the switching step said second current has a time ratio of less than 10 inclusive to said preselected first current.

22. A method in accordance with claim 19, wherein in the switching step a ratio between a duration of said preselected first current and a duration of said second current is variable.

23. A method in accordance with claim 19, wherein in the switching step the current is pulsed at preselected intervals in order to sense the terminal voltage of the secondary battery.

24. A method in accordance with claim 19, wherein said second voltage is selected as a charge voltage during pulse charging using said preselected first current, but is replaced with said first voltage during pulse charging using said second current.

* * * * *